US009978391B2

(12) United States Patent
Chen et al.

(10) Patent No.: US 9,978,391 B2
(45) Date of Patent: May 22, 2018

(54) METHOD, APPARATUS AND SERVER FOR PROCESSING NOISY SPEECH

(71) Applicant: TENCENT TECHNOLOGY (SHENZHEN) COMPANY LIMITED, Shenzhen, Guangdong (CN)

(72) Inventors: Guoming Chen, Shenzhen (CN); Yuanjiang Peng, Shenzhen (CN); Xianzhi Mo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days. days.

(21) Appl. No.: 15/038,783

(22) PCT Filed: Nov. 4, 2014

(86) PCT No.: PCT/CN2014/090215

§ 371 (c)(1),
(2) Date: May 24, 2016

(87) PCT Pub. No.: WO2015/078268

PCT Pub. Date: Jun. 4, 2015

(65) Prior Publication Data

US 2016/0379662 A1 Dec. 29, 2016

(30) Foreign Application Priority Data

Nov. 27, 2013 (CN) .......................... 2013 1 0616654

(51) Int. Cl.
*G10L 15/20* (2006.01)
*G10L 21/0232* (2013.01)
(Continued)

(52) U.S. Cl.
CPC .......... *G10L 21/0232* (2013.01); *G10L 25/21* (2013.01); *G10L 2021/02168* (2013.01)

(58) Field of Classification Search
CPC .................................................. G10L 21/0208
(Continued)

(56) References Cited

U.S. PATENT DOCUMENTS 6,564,184 B1 5/2003 Eriksson
7,003,099 B1 * 2/2006 Zhang .................. H04M 9/082 379/388.02
(Continued)

FOREIGN PATENT DOCUMENTS

CN 1373930 A 10/2002
CN 1430778 A 7/2003
(Continued)

OTHER PUBLICATIONS

International Search Report and Written Opinion of the ISA, ISA/CN, Haidian District, Beijing, dated Jan. 28, 2015.
(Continued)

*Primary Examiner* — Jakieda Jackson
(74) *Attorney, Agent, or Firm* — Anova Law Group, PLLC

(57) ABSTRACT

According to an embodiment, a power spectrum iteration factor is determined according to a noisy speech and a background noise, and a moving average power spectrum of the speech is obtained according to the power spectrum iteration factor. A server is able to trace the noisy speech according to the power spectrum iteration factor.

20 Claims, 4 Drawing Sheets

(51) Int. Cl.
*G10L 25/21* (2013.01)
*G10L 21/0216* (2013.01)

(58) Field of Classification Search
USPC .......................................................... 704/233
See application file for complete search history.

(56) References Cited

U.S. PATENT DOCUMENTS

| | | | | |
|---|---|---|---|---|
| 7,013,269 | B1 * | 3/2006 | Bhaskar | G10L 19/097 704/219 |
| 8,180,064 | B1 | 5/2012 | Avendano et al. | |
| 2006/0018460 | A1 * | 1/2006 | McCree | H04M 9/082 379/406.08 |
| 2008/0056510 | A1 | 3/2008 | Furuta et al. | |
| 2009/0163168 | A1 | 6/2009 | Andersen et al. | |
| 2010/0076769 | A1 | 3/2010 | Yu | |
| 2013/0339418 | A1 * | 12/2013 | Nikitin | G01R 29/02 708/819 |

FOREIGN PATENT DOCUMENTS

| | | | |
|---|---|---|---|
| CN | 101636648 | A | 1/2010 |
| CN | 102157156 | A | 8/2011 |
| CN | 102800322 | A | 11/2012 |
| CN | 103632677 | A | 3/2014 |
| JP | S59-222728 | A | 12/1984 |
| WO | WO-2015078268 | A1 | 6/2015 |

OTHER PUBLICATIONS

Chen Guo-ming et al., "Speech Enhancement Based on Masking Properties and Short-Time Spectral Amplitude Estimation", Journal of Electronics & Information Technology, vol. 29, No. 4, Apr. 2007.
Israel Cohen, Relaxed Statistical Model for Speech Enhancement and a priori SNR Estimation, CCIT Report #443, Oct. 2003.
Chinese Office Action for priority application CN 2013106166542 dated Nov. 4, 2015, with concise explanation of relevance (in English).

* cited by examiner

METHOD, APPARATUS AND SERVER FOR PROCESSING NOISY SPEECH

CROSS REFERENCE TO RELATED APPLICATIONS

This application is a U.S. National Phase application under 35 U.S.C. § 371 of International Application No. PCT/CN2014/090215, filed Nov. 4, 2014, entitled "METHOD, APPARATUS AND SERVER FOR PROCESSING NOISY SPEECH", the entire contents of which are incorporated herein by reference.

FIELD

The present disclosure relates to communications techniques, and more particularly, to a method, an apparatus and a server for processing noisy speech.

BACKGROUND

The quality of speech is inevitably degraded by environmental noise. In order to improve the quality of the speech, the environmental noise has to be reduced.

To reduce the environmental noise, a short-term spectral estimation algorithm is usually adopted. According to this algorithm, in the frequency domain, power spectrum of the speech is obtained according to the power spectrums of the noisy speech and the noise. Then amplitude spectrum of the speech is obtained according to the power spectrum of the speech. A time-domain speech is then obtained through an inverse Fourier transformation.

SUMMARY

According to various embodiments of the present disclosure, a method for processing noisy speech is provided. The method includes:

obtaining noise from noisy speech according to a quiet period of the noisy speech, wherein the noisy speech includes speech and the noise, the noisy speech is a frequency-domain signal;

obtaining a power spectrum iteration factor of a $m^{th}$ frame of the speech according to a power spectrum of a $(m-1)^{th}$ frame of the speech and a variance of a $(m-1)^{th}$ frame of the speech; wherein m is an integer;

determining a moving average power spectrum of the $m^{th}$ frame of the speech according to the power spectrum iteration factor of the $m^{th}$ frame of the speech, a power spectrum of the $(m-1)^{th}$ frame of the speech, and a minimum value of the power spectrum of the speech;

determining a signal-to-noise ratio (SNR) of the $m^{th}$ frame of the noisy speech according to the moving average power spectrum of the $m^{th}$ frame of the speech and a power spectrum of the $(m-1)^{th}$ frame of the noise; and obtaining a denoised time-domain speech according to the SNR of the $m^{th}$ frame of the noisy speech.

According to various embodiments of the present disclosure, an apparatus for processing noisy speech is provided. The apparatus includes:

a noise obtaining module, to obtain a noise in a noisy speech according to a quiet period of the noisy speech, wherein the noisy speech includes a speech and the noise and the noisy speech is a frequency-domain signal;

a power spectrum iteration factor obtaining module, to obtain a power spectrum iteration factor of the $m^{th}$ frame of the speech according to a power spectrum of the $(m-1)^{th}$ frame of the speech and an variance of the $(m-1)^{th}$ frame of the speech; wherein m is an integer;

a speech moving average power spectrum obtaining module, to determine a moving average power spectrum of the $m^{th}$ frame of the speech according to the power spectrum of the $(m-1)^{th}$ frame of the speech, the power spectrum iteration factor of the $m^{th}$ frame of the speech and a minimum value of the power spectrum of the speech;

a SNR obtaining module, to determine a signal-to-noise ratio (SNR) of the $m^{th}$ frame of the noisy speech according to the moving average power spectrum of the $m^{th}$ frame of the speech and the power spectrum of the $(m-1)^{th}$ frame of the noise; and a noisy speech processing module, to obtain a denoised time-domain speech according to the SNR of the $m^{th}$ frame of the noisy speech.

According to various embodiments of the present disclosure, a server for processing noisy speech is provided. The server includes:

a processor; and a non-transitory storage medium coupled to the processor; wherein the non-transitory storage medium stores machine readable instructions executable by the processor to perform a method for processing noisy speech, the method comprises:

obtaining a noise in a noisy speech according to a quiet period of the noisy speech, wherein the noisy speech includes speech and the noise and the noisy speech is a frequency-domain signal;

obtaining a power spectrum iteration factor of the $m^{th}$ frame of the speech according to a power spectrum of the $(m-1)^{th}$ frame of the speech and the variance of the $(m-1)^{th}$ frame of the speech; wherein m is an integer;

determining a moving average power spectrum of the $m^{th}$ frame of the speech according to the power spectrum iteration factor of the $m^{th}$ frame of the speech, a power spectrum of the $(m-1)^{th}$ frame of the speech, and a minimum value of the power spectrum of the speech;

obtaining an SNR of the $m^{th}$ frame of the noisy speech according to the moving average power spectrum of the $m^{th}$ frame of the speech and a power spectrum of the $(m-1)^{th}$ frame of the noise; and obtaining a denoised time-domain speech according to the SNR of the $m^{th}$ frame of the noisy speech.

Other aspects or embodiments of the present disclosure can be understood by those skilled in the art in light of the description, the claims, and the drawings of the present disclosure.

BRIEF DESCRIPTION OF THE DRAWINGS

Features of the present disclosure are illustrated by way of embodiment and not limited in the following figures, in which like numerals indicate like elements, in which.

DETAILED DESCRIPTION

The preset disclosure will be described in further detail hereinafter with reference to accompanying drawings and embodiments to make the technical solution and merits therein clearer.

For simplicity and illustrative purposes, the present disclosure is described by referring to embodiments. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

Figure 1:
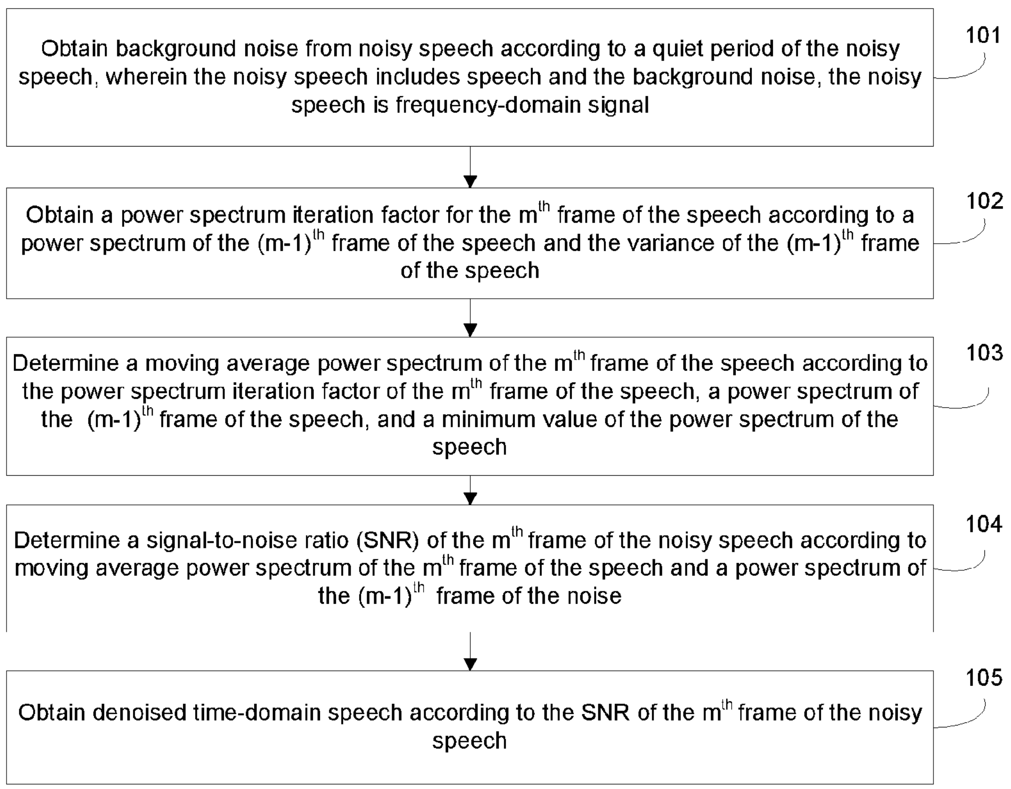
FIG. 1 shows an embodiment of a method for processing noisy speech according to the present disclosure.

FIG. 1 shows an embodiment of a method for processing noisy speech according to the present disclosure. As shown in FIG. 1, the method may be executed by a server. The method includes the following.

At block 101, background noise is obtained from noisy speech according to a quiet period of the noisy speech, wherein the noisy speech includes speech and the background noise, the noisy speech is frequency-domain signal.

At block 102, a power spectrum iteration factor of the $m^{th}$ frame of the speech is obtained according to a power spectrum of the $(m-1)^{th}$ frame of the speech and a variance of the $(m-1)^{th}$ frame of the speech.

At block 103, a moving average power spectrum of the $m^{th}$ frame of the speech is calculated according to the power spectrum iteration factor of the $m^{th}$ frame of the speech, the power spectrum of the $(m-1)^{th}$ frame of the speech, and a minimum value of the power spectrum of the speech.

At block 104, a signal-to-noise ratio (SNR) of the $m^{th}$ frame of the noisy speech is determined according to the moving average power spectrum of the $m^{th}$ frame of the speech and a power spectrum of the $(m-1)^{th}$ frame of the noise.

At block 105, denoised time-domain speech is obtained according to the SNR of the $m^{th}$ frame of the noisy speech.

In the method provided by the present disclosure, the power spectrum iteration factor is determined according to the noisy speech and the background noise, and the moving average power spectrum of the speech is obtained according to the power spectrum iteration factor. The server is able to trace the noisy speech according to the power spectrum iteration factor, such that a spectrum error of each frame between the estimated noise and actual noise is decreased. Therefore, the SNR of the denoised speech is increased, background noise in the speech is reduced and the quality of the speech is increased.

Figure 2:
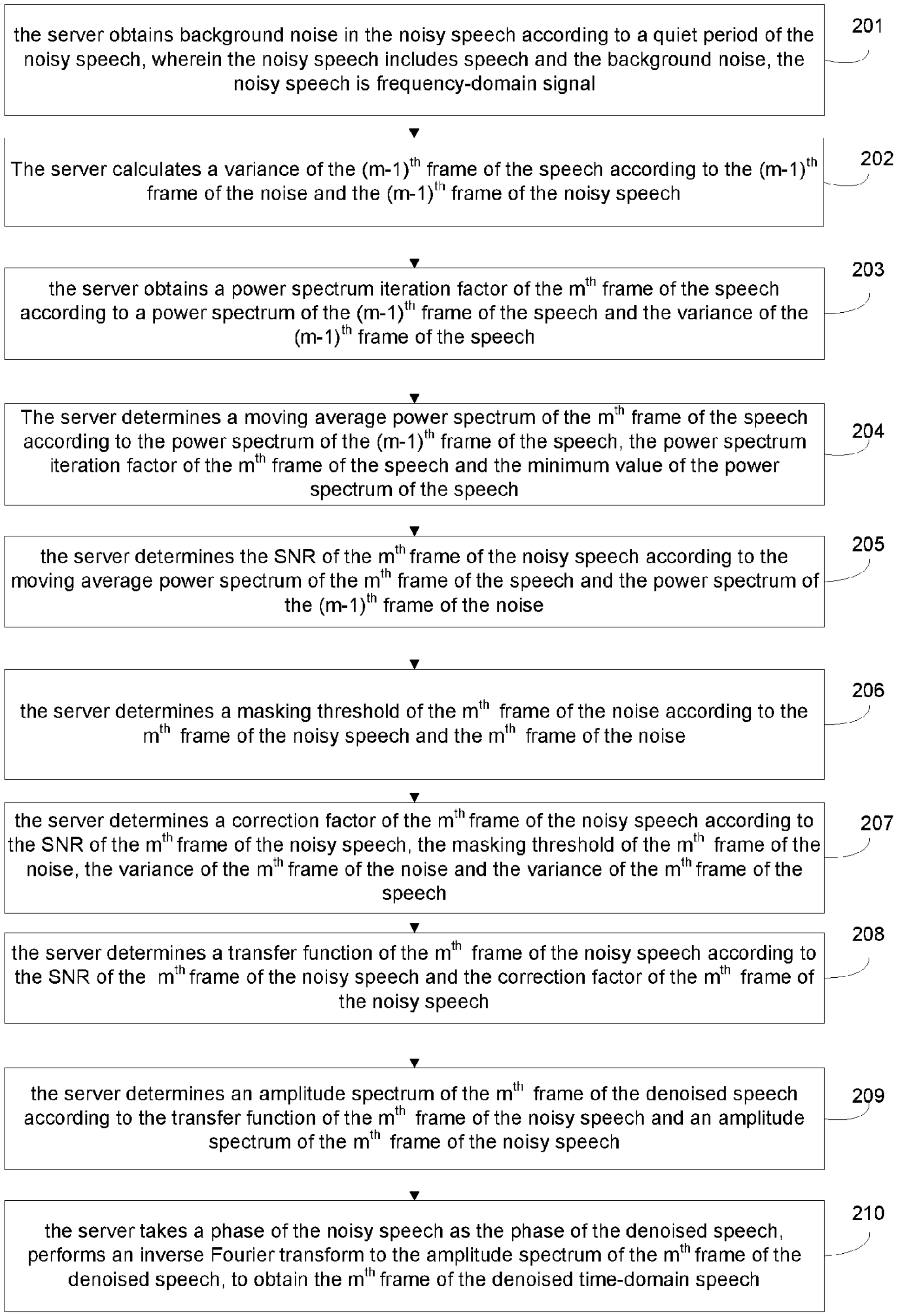
FIG. 2 shows another embodiment of a method for processing noisy speech according to the present disclosure.

FIG. 2 shows another embodiment of a method for processing noisy speech according to the present disclosure. As shown in FIG. 2, this embodiment may be executed by a server. The method includes the following.

At block 201, the server obtains background noise in the noisy speech according to a quiet period of the noisy speech, wherein the noisy speech includes speech and the background noise, the noisy speech is frequency-domain signal.

Speech is inevitably degraded by environmental noise. Therefore, original speech includes both speech and background noise. The original speech is a time-domain signal and may be denoted by y(m,n)=x(m,n)+d(m,n), wherein m is an index of frame and m=1, 2, 3, . . . ; n=0, 1, 2, . . . , N−1, N denotes length of a frame; x(m,n) denotes the time-domain speech, d(m,n) denotes the time-domain noise. The server performs a Fourier transform to the original time-domain speech to convert it to a frequency-domain signal, i.e., the noisy speech. The frequency-domain noisy speech may be denoted by Y(m,k)=X(m,k)+D(m,k), wherein m is an index of frame, k denotes discrete frequency, X(m,k) denotes frequency-domain speech, and D(m,k) denotes the frequency noise.

The server is configured to reduce the background noise (hereinafter shortened as noise) in the noise speech. The server may be an instant messaging server or a conference server, which is not intended to be restricted in the present disclosure.

Since the noisy speech includes noise, it is required to detect the noise to reduce the impact of the noise to the speech. Block 201 may specifically include: the server detects a quiet period of the noisy speech according to a preconfigured detecting algorithm to obtain the quiet period of the noisy speech. After obtaining the quiet period of the noisy speech, the server determines a frame corresponding to the quiet period as the noise. The quiet period is a time period during which the speech pauses.

The detecting algorithm may be configured in advance by a technician or by a user during usage, which is not intended to be restricted in the present disclosure. In one embodiment, the detecting algorithm may be speech active detection algorithm.

At block 202, the server calculates a variance $\sigma_s^2$ of the $(m-1)^{th}$ frame of the speech according to the $(m-1)^{th}$ frame of the noise and the $(m-1)^{th}$ frame of the noisy speech.

In one embodiment, the server determines the variance $\sigma_s^2$ of the $(m-1)^{th}$ frame of the speech according to following formula (1):

$$\sigma_s^2 \approx E\{|Y(m-1,k)|^2\} - E\{|D(m-1,k)|^2\}; \tag{1}$$

wherein Y(m−1,k) denotes the $(m-1)^{th}$ frame of the noisy speech; and $E\{|Y(m-1,k)|^2\}$ denotes an expectation of the $(m-1)^{th}$ frame of the noisy speech; D(m−1,k) denotes the $(m-1)^{th}$ frame of the noise; $E\{|D(m-1,k)|^2\}$ denotes an expectation of the $(m-1)^{th}$ frame of the noise.

At block 203, the server obtains a power spectrum iteration factor α(m,n) of the $m^{th}$ frame of the speech according to a power spectrum of the $(m-1)^{th}$ frame of the speech and the variance $\sigma_s^2$ of the $(m-1)^{th}$ frame of the speech.

Since frames of the noisy speech are relevant, a spectrum error of each frame between estimated noise and actual noise may be generated, thereby generating music noise. In order to trace the speech better, a parameter with changes with each frame of speech may be configured, i.e., the power spectrum iteration factor α(m,n).

In one embodiment, the server determines the power spectrum iteration factor α(m,n) of the $m^{th}$ frame of the speech according to a following formula (2):

$$\alpha(m,n) = \begin{cases} 0 & \alpha(m,n)_{opt} \le 0 \\ \alpha(m,n)_{opt} & 0 < \alpha(m,n)_{opt} < 1 \\ 1 & \alpha(m,n)_{opt} \ge 1 \end{cases}; \tag{2}$$

wherein $\alpha(m,n)_{opt}$ denotes an optimum value of α(m,n) under a minimum mean square condition and may be determined according to a following formula (3)

$$\alpha(m,n)_{opt}=\frac{\left(\hat{\lambda}_{X_{m-1|m-1}}-\sigma_s^2\right)^2}{\hat{\lambda}^2_{X_{m-1|m-1}}-2\sigma_s^2\hat{\lambda}_{X_{m-1|m-1}}+3\sigma_s^4},\qquad(3)$$

wherein m denotes the frame index of the speech; n=0, 1, 2, 3 . . . , N−1; N denotes the length of the frame, $\hat{\lambda}_{X_{m-1|m-1}}$ denotes the power spectrum of the $(m-1)^{th}$ frame of the speech. When m=1, $\hat{\lambda}_{X_{0|0}}=\lambda_{min}$, $\hat{\lambda}_{X_{0|0}}$ is a preconfigured initial value of the power spectrum of the speech, and $\lambda_{min}$ denotes a minimum value of the power spectrum of the speech.

For example, for the first frame of the speech, i.e. m=1, the power spectrum iteration factor is α(1,n), the preconfigured initial value of the power spectrum of the speech is $\hat{\lambda}_{X_{0|0}}=\lambda_{min}$. If m=1, the server calculates according to block 202 to obtain the variance $\sigma_s^2$ of the first frame of the speech, i.e., $\sigma_s^2 \approx E\{|Y(0,k)|^2\}-E\{|D(0,k)|^2\}$. The server determines $\alpha(1,n)_{opt}$ according to the above formula (3) according to the preconfigured initial value and the variance of the first frame of the speech, and compares $\alpha(1,n)_{opt}$ with 1 and 0, so as to determine the value of the power spectrum iteration factor α(1,n).

For the power spectrum estimation, an iteration algorithm with a fixed iteration factor is usually adopted. This method is usually effective to white noise but has a bad performance for colored noise. The reason is that the method cannot trace changes of the speech or the noise in time. In the embodiment of the present disclosure, a minimum mean square criterion is adopted to trace the speech, so as to estimate the power spectrum more accurately.

At block 204, the server determines a moving average power spectrum of the $m^{th}$ frame of the speech according to the power spectrum of the $(m-1)^{th}$ frame of the speech, the power spectrum iteration factor of the $m^{th}$ frame of the speech and the minimum value of the power spectrum of the speech.

In a conventional system, the moving average power spectrum of the speech is obtained according to a following iteration average formula: $\hat{\lambda}_{X_{m|m-1}}=\max\{(1-\alpha)\hat{\lambda}_{X_{m-1|m-1}}+\alpha A_{m-1}^2,\lambda_{min}\}$; wherein α is a constant and 0≤α≤1.

Due to the correlation between frames of the noisy speech and in order to trace the speech better, the constant α may be replaced by a parameter which is changed with each frame of speech, i.e., the power spectrum iteration factor α(m,n). In one embodiment of the present disclosure, the moving average power spectrum of the $m^{th}$ frame of the speech may be determined according to formula (4):

$$\hat{\lambda}_{X_{m|m-1}}=\max\{(1-\alpha(m,n))\hat{\lambda}_{X_{m-1|m-1}}+\alpha(m,n)A_{m-1}^2,\lambda_{min}\};\qquad(4)$$

wherein $\hat{\lambda}_{X_{m|m-1}}$ denotes the moving average power spectrum of the $m^{th}$ frame of the speech; $\hat{\lambda}_{X_{m-1|m-1}}$ denotes the power spectrum of the $(m-1)^{th}$ frame of the speech; α(m,n) denotes the power spectrum iteration factor the $m^{th}$ frame of the speech.

In one embodiment, the server obtains the power spectrum of the $(m-1)^{th}$ frame of the speech according to block 203.

At block 205, the server determines an SNR of the $m^{th}$ frame of the noisy speech according to the moving average power spectrum of the $m^{th}$ frame of the speech and a power spectrum of the $(m-1)^{th}$ frame of the noise.

In one embodiment, the server determines a conditional SNR of the $m^{th}$ frame of the noisy speech according to the $(m-1)^{th}$ frame of the noise and the moving average power spectrum of the $m^{th}$ frame of the speech based on formula (5):

$$\hat{\xi}_{m|m-1}=\frac{\hat{\lambda}_{X_{m|m-1}}}{\hat{\lambda}_{D_{m-1}}};\qquad(5)$$

wherein $\hat{\xi}_{m|m-1}$ denotes the conditional SNR of the $m^{th}$ frame of the noisy speech, $\hat{\lambda}_{D_{m-1}}$ denotes the power spectrum of the $(m-1)^{th}$ frame of the noise and $\hat{\lambda}_{D_{m-1}}\approx E\{|D(m-1,k)|^2\}$.

Then the server determines the SNR of the $m^{th}$ frame of the noisy speech according to the conditional SNR of the $m^{th}$ frame of the noisy speech based on formula (6):

$$\hat{\xi}_{m|m}=\frac{\hat{\xi}_{m|m-1}}{1+\hat{\xi}_{m|m-1}};\qquad(6)$$

wherein $\hat{\xi}_{m|m}$ denotes the SNR of the $m^{th}$ frame of the noisy speech.

It should be noted that, in the above blocks 201 to 205, after the server obtains the power spectrum iteration factor of the first frame of the speech according to the preconfigured initial value of the power spectrum of the speech, the server obtains the SNR of the first frame of the noisy. After the above blocks, the server determines the power spectrum of the first frame of the noisy speech according to the SNR of the first frame of the noisy speech based on formula (7):

$$\hat{\lambda}_{X_{m|m}}=\left(\frac{\hat{\xi}_{m|m}}{1+\hat{\xi}_{m|m}}\right)^2Y^2(m,k).\qquad(7)$$

Then the server puts the power spectrum of the first frame of the noisy speech into formula (3) to determine the power spectrum iteration factor of the second frame of the speech and executes blocks 202 to 205. In addition, the server determines the power spectrum of the $m^{th}$ frame of the speech according to SNR of the $m^{th}$ frame of the noisy speech and the $m^{th}$ frame of the noisy speech. Based on the power spectrum of the $m^{th}$ frame of the speech, the server determines the power spectrum iteration factor of the $(m+1)^{th}$ frame of the speech. As described above, the server calculates the SNR of each frame of the noisy speech according to the above iteration calculations.

At block 206, the server determines a masking threshold of the $m^{th}$ frame of the noise according to the $m^{th}$ frame of the noisy speech and the $m^{th}$ frame of the noise.

In one embodiment, the server calculates a power spectrum density $P(\omega)=Re^2(\omega)+Im^2(\omega)$ of the noisy speech according to a real part Re(ω) and an imaginary part Im(ω) of the noisy speech Y(m,k)=X(m,k)+D(m,k). According to the power spectrum density P(ω) of the noisy speech, the server determines a first masking threshold $T(k')=10^{log}10^{(C(k'))-O(k')/10}$. According to the first masking threshold and an absolute hearing threshold, the server obtains the masking threshold $T'(m,k')=\max(T(k'),T_{abx}(k'))$ of the $m^{th}$ frame of the noise, wherein C(k')=B(k')*SF(k'), $SF(k')=15.81+7.5(k'+0.474)-17.5\sqrt{1+(k'+0.474)^2}$, $$B(k') = \sum_{k'=bl_i}^{bh_i} P(\omega),$$

B(k') denotes energy of each critical band, $bh_i$ and $bl_i$ respectively denotes an upper limit and a lower limit of a critical band i, k' denotes an index of the critical band and is relevant to a sampling frequency. $O(k')=\alpha_{SFM}\times(14.5+k')+(1-\alpha_{sFm})\times 5.5$, SFM denotes spectrum flatness measure and $SFM=10*\log_{10} Gm/Am$, Gm denotes a geometric mean of the power spectrum density. Am denotes an arithmetic mean of the power spectrum density, $$\alpha_{SFM} = \min\left(\frac{SFM}{SFM_{max}}, 1\right)$$

denotes a modulation parameter, $T_{abx}(k')=3.64\ f^{-0.8}-6.5\ \exp(f-3.3)^2+10^{-3}\ f^4$ denotes the absolute hearing threshold, f denotes the sampling frequency of the noisy speech.

If the first masking threshold of the $m^{th}$ frame of the noise is lower than the absolute hearing threshold of human ears, it is meaningless to determine the first masking threshold as the masking threshold for the $m^{th}$ frame of the noise. Therefore, if the first masking threshold is lower than the absolute hearing threshold, the absolute hearing threshold is determined as the masking threshold of the $m^{th}$ frame of the noise. Thus, the masking threshold of the $m^{th}$ frame of the noise is denoted by $T'(m,k')=\max(T(k'),T_{abx}(k'))$.

At block 207, the server determines a correction factor $\mu(m,k)$ of the $m^{th}$ frame of the noisy speech according to the SNR of the $m^{th}$ frame of the noisy speech, the masking threshold of the $m^{th}$ frame of the noise, the variance of the $m^{th}$ frame of the noise and the variance of the $m^{th}$ frame of the speech.

In one embodiment, the correction factor $\mu(m,k)$ of the $m^{th}$ frame of the noisy speech is determined according to a following inequality expression (8):

$$\frac{\xi_{m|m}\sqrt{\sigma_s^2+\sigma_d^2}}{\sqrt{\sigma_s^2+T'(m,k')}} - \xi_{m|m} \le \mu(m,k) \le \frac{\xi_{m|m}\sqrt{\sigma_s^2+\sigma_d^2}}{\sqrt{\sigma_s^2-T'(m,k')}} - \xi_{m|m} \quad (8)$$

In one embodiment, the server determines the variance of the $m^{th}$ frame of the noise according to formula $\sigma_d^2=E(D^2(m,k))$. According to the variance of the $m^{th}$ frame of the speech, the variance of the $m^{th}$ frame of the noise, the masking threshold of the $m^{th}$ frame of the noise and the SNR of the $m^{th}$ frame of the noisy speech, the server determines a value range of the correction factor $\mu(m,k)$ based on the inequality expression (8), wherein $\xi_{m|m}$ denotes the SNR of the $m^{th}$ frame of the noisy speech, $\sigma_s^2$ denotes the variance of the $m^{th}$ frame of the speech, $\sigma_d^2$ denotes the variance of the $m^{th}$ frame of the noise, T'(m,k') denotes the masking threshold of the $m^{th}$ frame of the noise.

The correction factor is determined by the SNR of the $m^{th}$ frame of the noisy speech, the $m^{th}$ frame of the noisy speech, the $m^{th}$ frame of the noise and the masking threshold of the $m^{th}$ frame of the noise. The correction factor may change the form of a transfer function dynamically according to a practical requirement, so as to have an optimum compromised result between speech distortion and residual noise, and to improve quality of the speech.

It should be noted that, what is obtained in block 207 is a value range of the correction factor. If it is required to perform subsequent calculation of block 208 according to the correction factor, the server may determine a specific value for the correction factor according to the value range of the correction factor. In one embodiment, the server may select a maximum value in the value range. Certainly, other values in the value range may also be selected, which is not intended to be restricted in the present disclosure.

In addition, when the noise spectrum is subtracted from the noisy speech spectrum, a music noise with signal changes may be generated. At this time, the correction factor may be determined according to the masking threshold. The correction factor may dynamically change the form of the transfer function, so as to obtain a compromised result between speech distortion and residual noise, and to improve the quality of the speech.

At block 208, the server determines a transfer function of the $m^{th}$ frame of the noisy speech according to the SNR of the $m^{th}$ frame of the noisy speech and the correction factor of the $m^{th}$ frame of the noisy speech.

In one embodiment, the transfer function $G(\xi_{m|m})$ of the $m^{th}$ frame of the noisy speech may be determined according to a following formula (9).

$$G(\xi_{m|m}) = \frac{\hat{\xi}_{m|m}}{\mu(m,k)+\hat{\xi}_{m|m}} \quad (9)$$

Wherein $\hat{\xi}_{m|m}$ denotes the SNR of the $m^{th}$ frame of the noisy speech.

At block 209, the server determines an amplitude spectrum of the $m^{th}$ frame of a denoised speech according to the transfer function of the $m^{th}$ frame of the noisy speech and an amplitude spectrum of the $m^{th}$ frame of the noisy speech.

In one embodiment, the server obtains the amplitude spectrum $\hat{X}(m,k)$ of the $m^{th}$ frame of the denoised speech according to a following formula (10).

$$\hat{X}(m,k)=G(\xi_{m|m})\hat{Y}(m,k), \quad (10)$$

wherein $\hat{Y}(m,k)$ denotes the amplitude spectrum of the $m^{th}$ frame of the noisy speech.

At block 210, the server takes a phase of the noisy speech as the phase of the denoised speech, performs an inverse Fourier transform to the amplitude spectrum of the $m^{th}$ frame of the denoised speech, to obtain the $m^{th}$ frame of the denoised time-domain speech.

In one embodiment, the server obtains the phase of the noisy speech, takes the phase as the phase of the denoised speech, and obtains the $m^{th}$ frame of the denoised frequency-domain noisy speech according to the amplitude spectrum of the $m^{th}$ frame of the noisy speech. The server performs an inverse Fourier transform to the $m^{th}$ frame of the denoised frequency-domain noisy speech to obtain the $m^{th}$ frame of the denoised time-domain speech.

The $m^{th}$ frame of the noisy speech is taken as an example. The server obtains the phase $\varphi_{x,k}$ of the noisy speech. According to block 209, the server obtains the amplitude spectrum $\hat{X}(m,k)=G(\xi_{m|m})\hat{Y}(m,k)$ of the $m^{th}$ frame of the denoised speech. Thus, the $m^{th}$ frame of the denoised frequency-domain noisy speech is $Y_\varphi(m,k)=\hat{X}(m,k)\exp(j\phi_{x,k})$. The server performs an inverse Fourier transform to the $m^{th}$ frame of the denoised frequency-domain noisy speech to obtain the $m^{th}$ frame of the denoised time-domain speech. Each frame of the denoised time-domain speech may be obtained through iteration calculations based on the above.

It should be noted that, in the above blocks 202 to 210, the power spectrum iteration factor of the $m^{th}$ frame of the speech is obtained according to the $(m-1)^{th}$ frame of the noisy speech and the $(m-1)^{th}$ frame of the noise. The moving average power spectrum of the $m^{th}$ frame of the speech is further obtained. Then the SNR of the $m^{th}$ frame of the noisy speech is obtained. According to the masking threshold, the correction factor of the $m^{th}$ frame of the noisy speech is determined. Thereafter, the $m^{th}$ frame of the denoised time-domain speech is obtained. After the $m^{th}$ frame of the denoised time-domain speech is obtained, the server performs iterative calculations according to blocks 202 to 210 to obtain each frame of the denoised time-domain speech.

Figure 3:
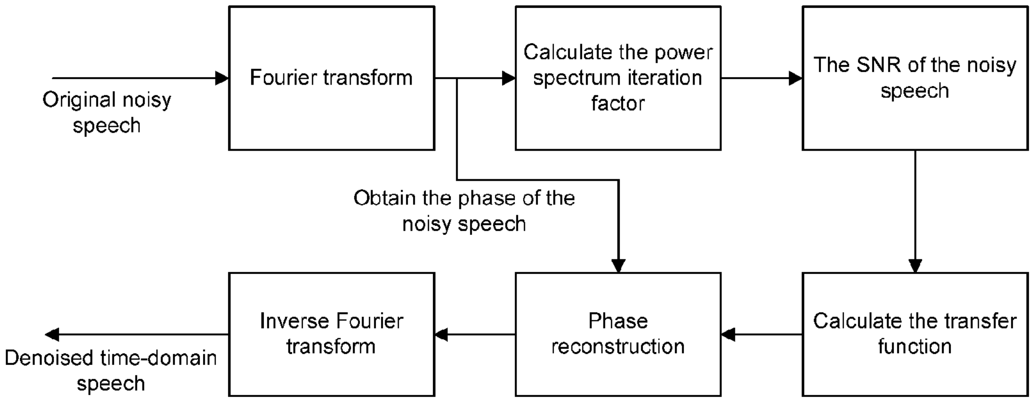
FIG. 3 shows an embodiment of transformation of the noisy speech according to the present disclosure.

FIG. 3 shows transforms of the speech according to an embodiment of the present disclosure. As shown in FIG. 3, the received original speech is y(m,n)=x(m,n)+d(m,n). A noisy speech is obtained through a Fourier transform to the original speech. According to the initial value of the power spectrum of the speech, the power spectrum iteration factor of each frame of the speech is obtained. The moving average power spectrum of each frame of the speech is then obtained according to the power spectrum iteration factor of each frame of the speech. Furthermore, the SNR of each frame of the noisy speech is obtained. The server calculates the transfer function according to the SNR of each frame of the noisy speech and the correction factor, and obtains the amplitude spectrum of the denoised speech according to the transfer function and the amplitude spectrum of the noisy speech. The server performs a phase reconstruction operation, i.e., takes the phase of the noisy speech as the phase of the denoised speech, and performs an inverse Fourier transform to the amplitude spectrum of the denoised speech to obtain the denoised time-domain speech.

Hereinafter, the deduction procedure of the iteration factor under the minimum mean square condition in block 203 is described.

Since frames of the noisy speech are relevant, if the obtained speech spectrum cannot trace the change of the speech in time, an error may be generated on the spectrum of the noisy speech and thus music noise is generated. In order to trace the energy of each frame of the speech better, it is possible to process the speech utilizing a minimum mean square condition. The detailed process may be as follows.

Let $$J(\alpha(m,n))=E\{(\hat{\lambda}_{X_{m|m-1}}-\sigma_s^{2})^2|\hat{\lambda}_{X_{m-1|m-1}}\}=E\{((1-\alpha(m,n))\hat{\lambda}_{X_{m|m-1}}+\alpha(m,n)A_{m-1}^{2}-\sigma_s^{2}\}=E\{[(1-\alpha(m,n))\hat{\lambda}_{X_{m|m-1}}]^2+[\alpha(m,n)A_{m-1}^{2}]^2+\sigma_s^{4}+2\alpha(m,n))A_{m-1}^{2}\hat{\lambda}_{X_{m|m-1}}-2\sigma_s^{2}(1-\alpha(m,n))\hat{\lambda}_{X_{m|m-1}}-2\sigma_s^{2}\alpha(m,n)A_{m-1}^{2}\}.$$

Calculate a first partial derivative of the J(α(m,n)) with respect to α(m,n), and let the first order partial derivative to be 0, i.e., $$\frac{\partial J(\alpha(m,n))}{\partial \alpha(m,n)}=0,$$

to obtain $$\alpha(m,n)_{opt}=\frac{\hat{\lambda}^2_{X_{m-1|m-1}}-\hat{\lambda}_{X_{m-1|m-1}}(E\{A^2_{m-1}\}+\sigma_s^2)+\sigma_s^2E\{A^2_{m-1}\}}{\hat{\lambda}^2_{X_{m-1|m-1}}-2E\{A^2_{m-1}\}\hat{\lambda}_{X_{m-1|m-1}}+E\{A^4_{m-1}\}}.$$

If the amplitude A follows a standard Gaussian distribution $N(0,\sigma_s^2)$, then $$\alpha(m,n)_{opt}=\frac{\left(\hat{\lambda}_{X_{m-1|m-1}}-\sigma_s^2\right)^2}{\hat{\lambda}^2_{X_{m-1|m-1}}-2\sigma_s^2\hat{\lambda}_{X_{m-1|m-1}}+3\sigma_s^4}.$$

Thus, under the minimum mean square condition, the power spectrum iteration factor is $$\alpha(m,n)=\begin{cases}0 & \alpha(m,n)_{opt}\le 0\\ \alpha(m,n)_{opt} & 0<\alpha(m,n)_{opt}<1\\ 1 & \alpha(m,n)_{opt}\ge 1\end{cases}.$$

Hereinafter, the deduction procedure of the inequality expression of the correction factor is described.

Suppose that $\hat{X}(m,k)$ denotes the amplitude spectrum of the denoised speech. Compared with the change of phase of the frequency-domain noisy speech, human ears are more sensitive to the change of amplitude spectrum of the frequency-domain noisy speech. Therefore, a following error function is defined: $\delta(m,k)=X^2(m,k)-X^2(m,k)$.

According to the requirement of hearing threshold of human ears, let $E[|\delta(m,n)|]\le T'(m,k)$, i.e., the energy of the distorted noise is below the masking threshold and is not sensed by human ears. For facilitating the deduction, let $$M=\frac{\xi_{m|m}}{\mu(m,k)+\xi_{m|m}},$$

then $$\begin{aligned}E\{|\delta(m,k)|\}&=E\{\left|X^2(m,k)-\hat{X}^2(m,k)\right|\}=E\{|X^2(m,k)-M^2Y^2(m,k)|\}\\&=E\{\left|X^2(m,k)-M^2(X(m,k)+D(m,k))^2\right|\}\\&=|E\{X^2(m,k)\}-M^2E(X(m,k)+D(m,k))^2\}|\\&=|E\{X^2(m,k)\}-M^2(E\{X^2(m,k)\}+E\{D^2(m,k)\})|\\&\le T'(m,k').\end{aligned}$$

Since $E\{X^2(m,k)\}=\sigma_s^2$ and $E\{D^2(m,k)\}=\sigma_d^2$, the above expression may be denoted by $\sigma_s^2-T'(m,k')\le|M^2(\sigma_s^2+\sigma_d^2)|\le\sigma_s^2+T'(m,k')$.

If $\sigma_s^2-T'(m,k')\le 0$, i.e., the power of the speech is lower than the masking threshold, $\mu(m,k)=1$; if $\sigma_s^2-T'(m,k')\ge 0$, i.e., the power of the speech is higher than the masking threshold, since M>0, $$\frac{\sigma_s^2-T'(m,k')}{\sigma_s^2+\sigma_d^2}\le|M^2|\le\frac{\sigma_s^2+T'(m,k')}{\sigma_s^2+\sigma_d^2}.$$

It can thus be seen that the $$\frac{\sigma_s^2\pm T'(m,k')}{\sigma_s^2+\sigma_d^2}$$

on two sides of the inequality expression corresponds to a correction performed based on wiener filtering.

The above inequality expression is simplified to $$\sqrt{\frac{\sigma_s^2 - T'(m,k')}{\sigma_s^2 + \sigma_d^2}} \le M \le \sqrt{\frac{\sigma_s^2 + T'(m,k')}{\sigma_s^2 + \sigma_d^2}},$$

i.e., $$\frac{\xi_{m|m}\sqrt{\sigma_s^2 + \sigma_d^2}}{\sqrt{\sigma_s^2 + T'(m,k')}} - \xi_{m|m} \le \mu(m,k) \le \frac{\xi_{m|m}\sqrt{\sigma_s^2 + \sigma_d^2}}{\sqrt{\sigma_s^2 + T'(m,k')}} - \xi_{m|m}.$$

In the method provided by the embodiments of the present disclosure, the power spectrum iteration factor is determined according to the noisy speech and the noise. The moving average power spectrum of the speech is obtained based on the power spectrum iteration factor. The server is able to trace the noisy speech through the power spectrum iteration factor, such that the power spectrum error between the estimated noise and the actual noise is decreased. Thus, the SNR of the enhanced speech is increased, noise in the speech is reduced and the quality of the speech is improved. In addition, when music noise with signal changes is generated during the spectral subtraction between the noisy speech and the noise, a correction factor is determined based on the masking threshold, wherein the correction factor is able to dynamically change the form of the transfer function. Thus, an optimum compromised result may be achieved between noise distortion and residual noise, which further improves the quality of the speech.

Figure 4:
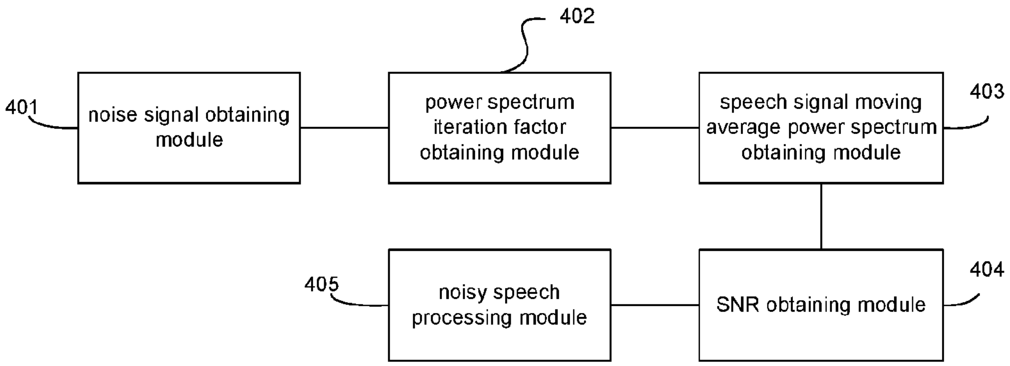
FIG. 4 shows an embodiment of an apparatus for processing noisy speech according to the present disclosure.

FIG. 4 shows an embodiment of a structure of an apparatus for processing noisy speech according to the present disclosure. As shown in FIG. 4, the apparatus includes: a noise obtaining module 401, a power spectrum iteration factor obtaining module 402, a speech moving average power spectrum obtaining module 403, an SNR obtaining module 404 and a noisy speech processing module 405.

The noise obtaining module 401 obtains noise in a noisy speech according to a quiet period of the noisy speech, wherein the noisy speech includes speech and the noise and the noisy speech is a frequency-domain signal.

The noise obtaining module 401 is coupled to the power spectrum iteration factor obtaining module 402. The power spectrum iteration factor obtaining module 402 obtains the power spectrum iteration factor of the $m^{th}$ frame of the speech according to a power spectrum of the $(m-1)^{th}$ frame of the speech and the variance of the $(m-1)^{th}$ frame of the speech.

The power spectrum iteration factor obtaining module 402 is coupled to the speech moving average power spectrum obtaining module 403. The speech moving average power spectrum obtaining module 403 determines the moving average power spectrum of the $m^{th}$ frame of the speech according to the power spectrum of the $(m-1)^{th}$ frame of the speech, the power spectrum iteration factor of the $m^{th}$ frame of the speech and a minimum value of the power spectrum of the speech.

The speech moving average power spectrum obtaining module 403 is coupled to the SNR obtaining module 404. The SNR obtaining module 404 determines the SNR of the $m^{th}$ frame of the noisy speech according to the moving average power spectrum of the $m^{th}$ frame of the speech and the power spectrum of the $(m-1)^{th}$ frame of the noise.

The SNR obtaining module 404 is coupled to the noisy speech processing module 405. The noisy speech processing module 405 obtains a denoised time-domain speech according to the SNR of the $m^{th}$ frame of the noisy speech.

In one embodiment, the power spectrum iteration factor obtaining module 402 calculates a variance $\sigma_s^2$ of the $(m-1)^{th}$ frame of the speech according to the $(m-1)^{th}$ frame of the noise and the $(m-1)^{th}$ frame of the noisy speech, wherein the variance of the $(m-1)^{th}$ frame of the speech $\sigma_s^2 \approx E\{|Y(m-1,k)|^2\} - E\{|D(m-1,k)|^2\}$. According to the power spectrum of the $(m-1)^{th}$ frame of the speech and the variance $\sigma_s^2$ of the $(m-1)^{th}$ frame of the speech, the power spectrum iteration factor obtaining module 402 obtains the power spectrum iteration factor $\alpha(m,n)$ of the $m^{th}$ frame of the speech according to the above formula (2), i.e., $$\alpha(m,n) = \begin{cases} 0 & \alpha(m,n)_{opt} \le 0 \\ \alpha(m,n)_{opt} & 0 < \alpha(m,n)_{opt} < 1 \\ 1 & \alpha(m,n)_{opt} \ge 1 \end{cases},$$

wherein $\alpha(m,n)_{opt}$ is an optimum value of $\alpha(m,n)$ under a minimum mean square condition, and $$\alpha(m,n)_{opt} = \frac{\left(\hat{\lambda}_{X_{m-1|m-1}} - \sigma_s^2\right)^2}{\hat{\lambda}^2_{X_{m-1|m-1}} - 2\sigma_s^2\hat{\lambda}_{X_{m-1|m-1}} + 3\sigma_s^4},$$

m denotes a frame index of the speech, n=0, 1, 2, 3 . . . , N−1; N denotes the length of the frame, $\hat{\lambda}_{X_{m-1|m-1}}$ denotes the power spectrum of the $(m-1)^{th}$ frame of the speech. When m=1, $\hat{\lambda}_{X_{0|0}} = \lambda_{min}$, $\hat{\lambda}_{X_{0|0}}$ is a preconfigured initial value of the power spectrum of the speech, and $\lambda_{min}$ denotes a minimum value of the power spectrum of the speech.

In one embodiment, the speech moving average power spectrum obtaining module 403 obtains the moving average power spectrum of the $m^{th}$ frame of the speech according to the above formula (4), i.e., $\hat{\lambda}_{X_{m|m-1}} = \max\{(1-\alpha(m,n))\hat{\lambda}_{X_{m-1|m-1}}\alpha(m,n)A_{m-1}^2, \lambda_{min}\}$; wherein $\hat{\lambda}_{X_{m|m-1}}$ denotes the moving average power spectrum of the $m^{th}$ frame of the speech, $A_{m-1}$ denotes the amplitude spectrum of the $(m-1)^{th}$ frame of the speech, and $A_{m-1}^2 \approx |Y(m-1,k)|^2 - |D(m-1,k)|^2$, $\lambda_{min}$ denotes the minimum value of the power spectrum of the speech.

In one embodiment, the noisy speech processing module 405 includes:

- a correction factor obtaining unit, to determine the correction factor of the $m^{th}$ frame of the noisy speech according to the SNR of the $m^{th}$ frame of the noisy speech, the variance of the $m^{th}$ frame of the speech, the variance of the $m^{th}$ frame of the noise and a masking threshold of the $m^{th}$ frame of the noise;
- a transfer function obtaining unit, to determine a transfer function of the $m^{th}$ frame of the noisy speech according to the SNR of the $m^{th}$ frame of the noisy speech and the correction factor of the $m^{th}$ frame of the noisy speech;
- an amplitude spectrum obtaining unit, to determine an amplitude spectrum of the $m^{th}$ frame of a denoised speech according to the transfer function of the $m^{th}$ frame of the noisy speech and an amplitude spectrum of the $m^{th}$ frame of the noisy speech; and
- a noisy speech processing unit, to take a phase of the noisy speech as a phase of the denoised speech, perform an inverse Fourier transform to the amplitude of the $m^{th}$ frame of the denoised speech to obtain the $m^{th}$ frame of a denoised time-domain speech.

In one embodiment, the correction factor obtaining unit is further to determine the masking threshold of the $m^{th}$ frame of the noise according to the $m^{th}$ frame of the noisy speech and the $m^{th}$ frame of the noise; obtain the correction factor $\mu(m,k)$ of the $m^{th}$ frame of the noisy speech according to the inequality expression (8), i.e., $$\frac{\xi_{m|m}\sqrt{\sigma_s^2+\sigma_d^2}}{\sqrt{\sigma_s^2+T'(m,k')}}-\xi_{m|m}\le\mu(m,k)\le\frac{\xi_{m|m}\sqrt{\sigma_s^2+\sigma_d^2}}{\sqrt{\sigma_s^2-T'(m,k')}}-\xi_{m|m},$$

wherein $\xi_{m|m}$ denotes the SNR of the $m^{th}$ frame of the noisy speech, $\sigma_s^2$ denotes the variance of the $m^{th}$ frame of the speech, $\sigma_d^2$ denotes the variance of the $m^{th}$ frame of the noise, $T'(m,k')$ denotes the masking threshold of the $m^{th}$ frame of the noise, k' denotes an index of a critical band, and k denotes discrete frequency.

In one embodiment, the transfer function obtaining unit is further to obtain the transfer function $G(\xi_{m|m})$ of the $m^{th}$ frame of the noisy speech according to the formula (10), i.e., $$G(\xi_{m|m})=\frac{\hat{\xi}_{m|m}}{\mu(m,k)+\hat{\xi}_{m|m}};$$

wherein $\hat{\xi}_{m|m}$ denotes the SNR of the $m^{th}$ frame of the noisy speech.

In one embodiment, the apparatus may further include:

a speech spectrum obtaining module, to determine a power spectrum of the $m^{th}$ frame of the speech according to the $m^{th}$ frame of the speech, the SNR of the $m^{th}$ frame of the noisy speech and the $m^{th}$ frame of the noisy speech;

the power spectrum iteration factor obtaining module 402 is further to determine the power spectrum iteration factor of $\alpha(m+1)^{th}$ frame of the speech according to the power spectrum of the $m^{th}$ frame of the speech.

In one embodiment, the SNR obtaining module 404 is further to obtain a conditional SNR of the $m^{th}$ frame of the noisy speech according to the $(m-1)^{th}$ frame of the noise and the moving average power spectrum of the $m^{th}$ frame of the speech based on the formula (5), i.e.

$$\hat{\xi}_{m|m-1}=\frac{\hat{\lambda}_{X_{m|m-1}}}{\hat{\lambda}_{D_{m-1}}},$$

wherein $\hat{\xi}_{m|m-1}$ denotes the conditional SNR of the $m^{th}$ frame of the noisy speech, $\hat{\lambda}_{D_{m-1}}$ denotes the power spectrum of the $(m-1)^{th}$ frame of the noise, and $\hat{\lambda}_{D_{m-1}}\approx E\{|D(m-1,k)|^2\}$. The SNR obtaining module 404 is further to obtain the SNR of the $m^{th}$ frame of the noisy speech according to the conditional SNR of the $m^{th}$ frame of the noisy speech based on formula (6), i.e., $$\hat{\xi}_{m|m}=\frac{\hat{\xi}_{m|m-1}}{1+\hat{\xi}_{m|m-1}},$$

wherein denotes the SNR of the $m^{th}$ frame of the noisy speech.

In view of the above, the apparatus provided by the embodiment of the present disclosure determines the power spectrum iteration factor according to the noisy speech and the noise. The moving average power spectrum of the speech is obtained based on the power spectrum iteration factor. The server is able to trace the noisy speech through the power spectrum iteration factor, such that the power spectrum error on each noisy speech before and after the spectral subtraction. Thus, the SNR of the enhanced speech is increased, noise in the speech is reduced and the quality of the speech is increased. In addition, when music noise with changes is generated during the spectral subtraction between the noisy speech and the noise, a correction factor is determined based on the masking threshold, wherein the correction factor is able to dynamically change the form of the transfer function. Thus, an optimum compromised result may be achieved between noise distortion and residual noise, which further improves the quality of the speech.

It should be noted that, in the apparatus described above, the division of the above modules are merely embodiments. In a practical application, the above functions may be implemented by various modules inside a server. In addition, the apparatus provided by the embodiment of the present disclosure has the similar idea with the method embodiment described earlier. Detailed implementations of the functions may be seen in the method embodiments and are not repeated herein.

Figure 5:
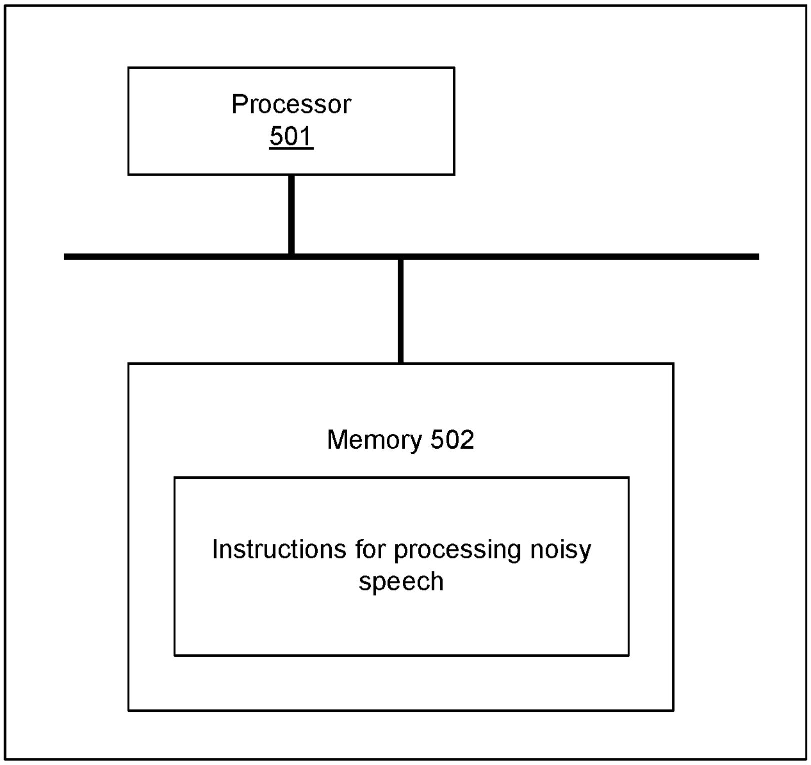
FIG. 5 shows an embodiment of a server according to the present disclosure.

FIG. 5 shows an embodiment of a server according to the present disclosure. As shown in FIG. 5, the server includes:

a processor 501; and a non-transitory storage medium 502 coupled to the processor 501; wherein the non-transitory storage medium stores machine readable instructions executable by the processor 501 to perform a method for processing noisy speech, the method includes:

obtaining a noise in a noisy speech according to a quiet period of the noisy speech, wherein the noisy speech includes speech and the noise and the noisy speech is a frequency-domain signal;

obtaining a power spectrum iteration factor of the $m^{th}$ frame of the speech according to a power spectrum of the $(m-1)^{th}$ frame of the speech and the variance of the $(m-1)^{th}$ frame of the speech;

determining a moving average power spectrum of the $m^{th}$ frame of the speech according to the power spectrum iteration factor of the $m^{th}$ frame of the speech, a power spectrum of the $(m-1)^{th}$ frame of the speech, and a minimum value of the power spectrum of the speech;

obtaining an SNR of the $m^{th}$ frame of the noisy speech according to the moving average power spectrum of the $m^{th}$ frame of the speech and a power spectrum of the $(m-1)^{th}$ frame of the noise; and obtaining a denoised time-domain speech according to the SNR of the $m^{th}$ frame of the noisy speech.

The non-transitory storage medium may be a ROM, magnetic disk, compact disk or any other types of non-transitory storage medium known in the art.

What has been described and illustrated herein is an embodiment of the disclosure along with some of its variations. The terms, descriptions and figures used herein are set forth by way of illustration. Many variations are possible within the spirit and scope of the disclosure, which is intended to be defined by the following claims and their equivalents.

What is claimed is:

1. A method for processing noisy speech by a server including at least one processor, comprising:

receiving, by the server, an original speech, the server being an instant messaging server or a conference server;

obtaining, by the server, noise from noisy speech according to a quiet period of the noisy speech, wherein the noisy speech includes speech and the noise, the noisy speech is a frequency-domain signal obtained from the original speech;

obtaining, by the server, a power spectrum iteration factor of a $m^{th}$ frame of the speech according to a power spectrum of a $(m-1)^{th}$ frame of the speech and a variance of a $(m-1)^{th}$ frame of the speech such that the power spectrum iteration factor is not a fixed value for each frame; wherein m is an integer;

determining, by the server, a moving average power spectrum of each frame of the speech, allowing the server to trace the noisy speech through the power spectrum iteration factor, such that a power spectrum error on each frame of the noisy speech between estimated noise and actual noise is decreased, wherein the $m^{th}$ frame of the speech according to the power spectrum iteration factor of the $m^{th}$ frame of the speech, a power spectrum of the $(m-1)^{th}$ frame of the speech, and a minimum value of the power spectrum of the speech;

determining, by the server, a signal-to-noise ratio (SNR) of the $m^{th}$ frame of the noisy speech according to the moving average power spectrum of the $m^{th}$ frame of the speech and a power spectrum of the $(m-1)^{th}$ frame of the noise; and outputting, by the server, a denoised time-domain speech according to the SNR of the $m^{th}$ frame of the noisy speech, wherein each frame of the denoised time-domain speech is generated from iteration operations based on the power spectrum iteration factor which traces the noisy speech in time, so as to produce the denoised time-domain speech with increased SNR and improved speech quality;

wherein the obtaining the power spectrum iteration factor of the $m^{th}$ frame of the speech according to the power spectrum of the $(m-1)^{th}$ frame of the speech and the variance of the $(m-1)^{th}$ frame of the speech comprises:

determining the variance $\sigma_s^2$ of the $(m-1)^{th}$ frame of the speech, wherein $\sigma_s^2 \approx E\{|Y(m-1,k)|^2\} - E\{|D(m-1,k)|^2\}$; wherein Y(m−1,k) denotes the $(m-1)^{th}$ frame of the noisy speech; and $E\{|Y(m-1,k)|^2\}$ denotes an expectation of the $(m-1)^{th}$ frame of the noisy speech; D(m−1,k) denotes the $(m-1)^{th}$ frame of the noise; $E\{|D(m-1,k)|^2\}$ denotes an expectation of the $(m-1)^{th}$ frame of the noise;

determining the power spectrum iteration factor α(m,n) of the $m^{th}$ frame of the speech according to a following formula:

$$\alpha(m,n) = \begin{cases} 0 & \alpha(m,n)_{opt} \le 0 \\ \alpha(m,n)_{opt} & 0 < \alpha(m,n)_{opt} < 1 \\ 1 & \alpha(m,n)_{opt} \ge 1 \end{cases};$$

wherein $\alpha(m,n)_{opt}$ denotes an optimum value of α(m,n) under a minimum mean square condition and is determined by $$\alpha(m,n)_{opt} = \frac{\left(\hat{\lambda}_{X_{m-1|m-1}} - \sigma_s^2\right)^2}{\hat{\lambda}^2_{X_{m-1|m-1}} - 2\sigma_s^2\hat{\lambda}_{X_{m-1|m-1}} + 3\sigma_s^4},$$

wherein m denotes a frame index of the speech; n=0, 1, 2, 3 . . . , N−1; N denotes a length of the frame, $\hat{\lambda}_{X_{m-1|m-1}}$ denotes the power spectrum of the $(m-1)^{th}$ frame of the speech; when m=1, $\hat{\lambda}_{X_{0|0}} = \lambda_{min}$, $\hat{\lambda}_{X_{0|0}}$ is a preconfigured initial value of the power spectrum of the speech, and $\lambda_{min}$ denotes a minimum value of the power spectrum of the speech.

2. The method of claim 1, wherein the determining the moving average power spectrum of the $m^{th}$ frame of the speech according to the power spectrum iteration factor of the $m^{th}$ frame of the speech, the power spectrum of the $(m-1)^{th}$ frame of the speech and the minimum value of the power spectrum of the speech comprises:

determining the moving average power spectrum of the $m^{th}$ frame of the speech according to a following formula:

$$\hat{\lambda}_{X_{m|m-1}} = \max\{(1-\alpha(m,n))\hat{\lambda}_{X_{m-1|m-1}} + \alpha(m,n)A_{m-1}^2, \lambda_{min}\};$$

wherein $\hat{\lambda}_{X_{m|m-1}}$ denotes the moving average power spectrum of the $m^{th}$ frame of the speech; $\hat{\lambda}_{X_{m-1|m-1}}$ denotes the power spectrum of the $(m-1)^{th}$ frame of the speech; α(m,n) denotes the power spectrum iteration factor the $m^{th}$ frame of the speech; $A_{m-1}$ denotes an amplitude spectrum of the $(m-1)^{th}$ frame of the speech, and $\lambda_{min}$ denotes a minimum value of the power spectrum of the speech.

3. The method of claim 1, wherein the obtaining the denoised time-domain speech according to the SNR of the $m^{th}$ frame of the noisy speech comprises:

determining a correction factor of the $m^{th}$ frame of the noisy speech according to the SNR of the $m^{th}$ frame of the noisy speech, a masking threshold of the $m^{th}$ frame of the noise, an variance of the $m^{th}$ frame of the noise and an variance of the $m^{th}$ frame of the speech, the masking threshold being a maximum value of: a first masking threshold calculated based on power spectrum density of the noisy speech and an absolute hearing threshold of human ears;

determining a transfer function of the $m^{th}$ frame of the noisy speech according to the SNR of the $m^{th}$ frame of the noisy speech and the correction factor of the $m^{th}$ frame of the noisy speech, wherein the correction factor dynamically changes a form of the transfer function so as to obtain a compromised result between speech distortion and residual noise, and to improve the quality of the speech;

obtaining a $m^{th}$ frame of a denoised speech according to an amplitude spectrum of the $m^{th}$ frame of the noisy speech and the transfer function of the $m^{th}$ frame of the noisy speech; and taking a phase of the noisy speech as a phase of the denoised speech, performing an inverse Fourier transform to the amplitude spectrum of the $m^{th}$ frame of the denoised speech, to obtain a $m^{th}$ frame of the denoised time-domain speech.

4. The method of claim 3, wherein the determining the correction factor of the $m^{th}$ frame of the noisy speech according to the SNR of the $m^{th}$ frame of the noisy speech, the masking threshold of the $m^{th}$ frame of the noise, the variance of the $m^{th}$ frame of the noise and the variance of the $m^{th}$ frame of the speech comprises:

determining the correction factor of the $m^{th}$ frame of the noisy speech according to a following formula:

$$\frac{\xi_{m|m}\sqrt{\sigma_s^2+\sigma_d^2}}{\sqrt{\sigma_s^2+T'(m,k')}}-\xi_{m|m}\le\mu(m,k)\le\frac{\xi_{m|m}\sqrt{\sigma_s^2+\sigma_d^2}}{\sqrt{\sigma_s^2-T'(m,k)}}-\xi_{m|m};$$

wherein $\xi_{m|m}$ denotes the SNR of the $m^{th}$ frame of the noisy speech, $\sigma_s^2$ denotes the variance of the $m^{th}$ frame of the speech, $\sigma_d^2$ denotes the variance of the $m^{th}$ frame of the noise, T'(m,k') denotes the masking threshold of the $m^{th}$ frame of the noise, k' denotes an index of a critical band, and k denotes discrete frequency.

5. The method of claim 3, wherein the determining the transfer function of the $m^{th}$ frame of the noisy speech according to the SNR of the $m^{th}$ frame of the noisy speech and the correction factor of the $m^{th}$ frame of the noisy speech comprises:

determining the transfer function of the $m^{th}$ frame of the noisy speech according to a following formula:

$$G(\xi_{m|m})=\frac{\hat{\xi}_{m|m}}{\mu(m,k)+\hat{\xi}_{m|m}};$$

wherein $\hat{\xi}_{m|m}$ denotes the SNR of the $m^{th}$ frame of the noisy speech.

6. The method of claim 1, further comprising:

after determining the SNR of the $m^{th}$ frame of the noisy speech according to the moving average power spectrum of the $m^{th}$ frame of the speech and the power spectrum of the $(m-1)^{th}$ frame of the noise, determining a power spectrum of the $m^{th}$ frame of the speech according to the SNR of the $m^{th}$ frame of the noisy speech and the $m^{th}$ frame of the noisy speech; and determining a power spectrum iteration factor of a $(m+1)^{th}$ frame of the speech according to the power spectrum of the $m^{th}$ frame of the speech.

7. The method of claim 1, wherein the determining the SNR of the $m^{th}$ frame of the noisy speech according to the moving average power spectrum of the $m^{th}$ frame of the speech and the power spectrum of the $(m-1)^{th}$ frame of the noise comprises:

determining a conditional SNR of the $m^{th}$ frame of the noisy speech according to a following formula:

$$\hat{\xi}_{m|m-1}=\frac{\hat{\lambda}_{X_{m|m-1}}}{\hat{\lambda}_{D_{m-1}}};$$

wherein $\hat{\xi}_{m|m-1}$ denotes the conditional SNR of the $m^{th}$ frame of the noisy speech, $\hat{\lambda}_{X_{m|m-1}}$ denotes the moving average power spectrum of the $m^{th}$ frame of the speech; $\hat{\lambda}_{D_{m-1}}$ denotes the power spectrum of the $(m-1)^{th}$ frame of the noise and $\hat{\lambda}_{D_{m-1}}\approx E\{|D(m-1,k)|^2\}$; and determining the SNR of the $m^{th}$ frame of the noisy speech according to a following formula:

$$\hat{\xi}_{m|m}=\frac{\hat{\xi}_{m|m-1}}{1+\hat{\xi}_{m|m-1}};$$

wherein $\hat{\xi}_{m|m}$ denotes the SNR of the $m^{th}$ frame of the noisy speech.

8. An apparatus for processing noisy speech, comprising:

a processor;

a memory coupled to the processor;

a plurality of program modules stored in the memory and to be executed by the processor, the plurality of program modules comprising:

a noise obtaining module, to receive an original speech from an instant messaging server or a conference server; obtain a noise in a noisy speech according to a quiet period of the noisy speech, wherein the noisy speech includes a speech and the noise and the noisy speech is a frequency-domain signal obtained from the original speech;

a power spectrum iteration factor obtaining module, to obtain a power spectrum iteration factor of the $m^{th}$ frame of the speech according to a power spectrum of the $(m-1)^{th}$ frame of the speech and an variance of the $(m-1)^{th}$ frame of the speech such that the power spectrum iteration factor is not a fixed value for each frame; wherein m is an integer;

a speech moving average power spectrum obtaining module, to determine a moving average power spectrum of each frame of the speech, allowing the server to trace the noisy speech through the power spectrum iteration factor, such that a power spectrum error on each frame of the noisy speech between estimated noise and actual noise is decreased, wherein the $m^{th}$ frame of the speech according to the power spectrum of the $(m-1)^{th}$ frame of the speech, the power spectrum iteration factor of the $m^{th}$ frame of the speech and a minimum value of the power spectrum of the speech;

a SNR obtaining module, to determine a signal-to-noise ratio (SNR) of the $m^{th}$ frame of the noisy speech according to the moving average power spectrum of the $m^{th}$ frame of the speech and the power spectrum of the $(m-1)^{th}$ frame of the noise; and a noisy speech processing module, to output a denoised time-domain speech according to the SNR of the $m^{th}$ frame of the noisy speech, wherein each frame of the denoised time-domain speech is generated from iteration operations based on the power spectrum iteration factor which traces the noisy speech in time, so as to produce the denoised time-domain speech with increased SNR and improved speech quality;

wherein the power spectrum iteration factor obtaining module is further to calculate a variance $\sigma_s^2$ of the $(m-1)^{th}$ frame of the speech according to the $(m-1)^{th}$ frame of the noise and the $(m-1)^{th}$ frame of the noisy speech, wherein $\sigma_s^2\approx E\{|Y(m-1,k)|^2\}-E\{|D(m-1,k)|^2\}$;

obtain, according to the power spectrum of the $(m-1)^{th}$ frame of the speech and the variance $\sigma_s^2$ of the $(m-1)^{th}$ frame of the speech, the power spectrum iteration factor $\alpha(m,n)$ of the $m^{th}$ frame of the speech according to a following formula:

$$\alpha(m,n)=\begin{cases}0 & \alpha(m,n)_{opt}\le 0\\ \alpha(m,n)_{opt} & 0<\alpha(m,n)_{opt}<1\\ 1 & \alpha(m,n)_{opt}\ge 1\end{cases},$$

wherein $\alpha(m,n)_{opt}$ is an optimum value of $\alpha(m,n)$ under a minimum mean square condition, and $$\alpha(m,n)_{opt}=\frac{(\hat{\lambda}_{X_{m-1|m-1}}-\sigma_s^2)^2}{\hat{\lambda}^2_{X_{m-1|m-1}}-2\sigma_s^2\hat{\lambda}_{X_{m-1|m-1}}+3\sigma_s^4},$$

m denotes a frame index of the speech, n=0, 1, 2, 3 . . . , N−1; N denotes a length of the frame, $\hat{\lambda}_{X_{m-1|m-1}}$ denotes the power spectrum of the $(m-1)^{th}$ frame of the speech; when m=1, $\hat{\lambda}_{X_{0|0}}=\lambda_{min}$, $\hat{\lambda}_{X_{0|0}}$ is a preconfigured initial value of the power spectrum of the speech, and $\lambda_{min}$ denotes a minimum value of the power spectrum of the speech.

9. The apparatus of claim 8, wherein the speech moving average power spectrum obtaining module is further to obtain the moving average power spectrum of the $m^{th}$ frame of the speech according to a following formula:

$$\hat{\lambda}_{X_{m|m-1}}=\max\{(1-\alpha(m,n))\hat{\lambda}_{X_{m-1|m-1}}+\alpha(m,n)A_{m-1}^2,\lambda_{min}\};$$

wherein $\hat{\lambda}_{X_{m|m-1}}$ denotes the moving average power spectrum of the $m^{th}$ frame of the speech, $A_{m-1}$ denotes an amplitude spectrum of the $(m-1)^{th}$ frame of the speech, and $A_{m-1}^2\approx|Y(m-1,k)|^2-|D(m-1,k)|^2$, $\lambda_{min}$ denotes a minimum value of the power spectrum of the speech.

10. The apparatus of claim 8, wherein the noisy speech processing module comprises:

a correction factor obtaining unit, to determine a correction factor of the $m^{th}$ frame of the noisy speech according to the SNR of the $m^{th}$ frame of the noisy speech, an variance of the $m^{th}$ frame of the speech, an variance of the $m^{th}$ frame of the noise and a masking threshold of the $m^{th}$ frame of the noise, the masking threshold being a maximum value of: a first masking threshold calculated based on power spectrum density of the noisy speech and an absolute hearing threshold of human ears;

a transfer function obtaining unit, to determine a transfer function of the $m^{th}$ frame of the noisy speech according to the SNR of the $m^{th}$ frame of the noisy speech and the correction factor of the $m^{th}$ frame of the noisy speech, wherein the correction factor dynamically changes a form of the transfer function so as to obtain a compromised result between speech distortion and residual noise, and to improve the quality of the speech;

an amplitude spectrum obtaining unit, to determine an amplitude spectrum of a $m^{th}$ frame of a denoised speech according to the transfer function of the $m^{th}$ frame of the noisy speech and an amplitude spectrum of the $m^{th}$ frame of the noisy speech; and a noisy speech processing unit, to take a phase of the noisy speech as a phase of the denoised speech, perform an inverse Fourier transform to the amplitude of the $m^{th}$ frame of the denoised speech to obtain a $m^{th}$ frame of the denoised time-domain speech.

11. The apparatus of claim 10, wherein the correction factor obtaining unit is further to determine the masking threshold of the $m^{th}$ frame of the noise according to the $m^{th}$ frame of the noisy speech and the $m^{th}$ frame of the noise;

obtain the correction factor μ(m,k) of the $m^{th}$ frame of the noisy speech according to a following inequality expression:

$$\frac{\xi_{m|m}\sqrt{\sigma_s^2+\sigma_d^2}}{\sqrt{\sigma_s^2+T'(m,k')}}-\xi_{m|m}\le\mu(m,k)\le\frac{\xi_{m|m}\sqrt{\sigma_s^2+\sigma_d^2}}{\sqrt{\sigma_s^2-T'(m,k')}}-\xi_{m|m},$$

wherein $\xi_{m|m}$ denotes the SNR of the $m^{th}$ frame of the noisy speech, $\sigma_s^2$ denotes the variance of the $m^{th}$ frame of the speech, $\sigma_d^2$ denotes the variance of the $m^{th}$ frame of the noise, T'(m,k') denotes the masking threshold of the $m^{th}$ frame of the noise, k' denotes an index of a critical band, and k denotes discrete frequency.

12. The apparatus of claim 10, wherein the transfer function obtaining unit is further to obtain the transfer function $G(\hat{\xi}_{m|m})$ of the $m^{th}$ frame of the noisy speech according to a following formula:

$$G(\xi_{m|m})=\frac{\hat{\xi}_{m|m}}{\mu(m,k)+\hat{\xi}_{m|m}};$$

wherein $\hat{\xi}_{m|m}$ denotes the SNR of the $m^{th}$ frame of the noisy speech.

13. The apparatus of claim 8, further comprising:

a speech spectrum obtaining module, to determine a power spectrum of the $m^{th}$ frame of the speech according to the $m^{th}$ frame of the speech, the SNR of the $m^{th}$ frame of the noisy speech and the $m^{th}$ frame of the noisy speech; and the power spectrum iteration factor obtaining module is further to determine a power spectrum iteration factor of a $(m+1)^{th}$ frame of the speech according to the power spectrum of the $m^{th}$ frame of the speech.

14. The apparatus of claim 8, wherein the SNR obtaining module is further to obtain a conditional SNR of the $m^{th}$ frame of the noisy speech according to the $(m-1)^{th}$ frame of the noise and the moving average power spectrum of the $m^{th}$ frame of the speech based on a following formula:

$$\hat{\xi}_{m|m-1}=\frac{\hat{\lambda}_{X_{m|m-1}}}{\hat{\lambda}_{D_{m-1}}},$$

wherein $\hat{\xi}_{m|m-1}$ denotes the conditional SNR of the $m^{th}$ frame of the noisy speech, $\hat{\lambda}_{D_{m-1}}$ denotes the power spectrum of the $(m-1)^{th}$ frame of the noise, and $\hat{\lambda}_{D_{m-1}}\approx E\{|D(m-1,k)|^2\}$;

obtain the SNR of the $m^{th}$ frame of the noisy speech according to the conditional SNR of the $m^{th}$ frame of the noisy speech based on a following formula:

$$\hat{\xi}_{m|m}=\frac{\hat{\xi}_{m|m-1}}{1+\hat{\xi}_{m|m-1}},$$

wherein $\hat{\xi}_{m|m}$ denotes the SNR of the $m^{th}$ frame of the noisy speech.

15. A server, comprising:

a processor; and a non-transitory storage medium coupled to the processor; wherein the non-transitory storage medium stores machine readable instructions executable by the processor to perform a method for processing noisy speech, the method comprises:

receiving, by the server, an original speech, the server being an instant messaging server or a conference server;

obtaining, by the server, noise from noisy speech according to a quiet period of the noisy speech, wherein the noisy speech includes speech and the noise, the noisy speech is a frequency-domain signal obtained from the original speech;

obtaining, by the server, a power spectrum iteration factor of the $m^{th}$ frame of the speech according to a power spectrum of the $(m-1)^{th}$ frame of the speech and the variance of the $(m-1)^{th}$ frame of the speech such that the power spectrum iteration factor is not a fixed value for each frame; wherein m is an integer;

determining, by the server, a moving average power spectrum of each frame of the speech, allowing the server to trace the noisy speech through the power spectrum iteration factor, such that a power spectrum error on each frame of the noisy speech between estimated noise and actual noise is decreased, wherein the $m^{th}$ frame of the speech, a power spectrum of the $(m-1)^{th}$ frame of the speech, and a minimum value of the power spectrum of the speech;

obtaining, by the server, an SNR of the $m^{th}$ frame of the noisy speech according to the moving average power spectrum of the $m^{th}$ frame of the speech and a power spectrum of the $(m-1)^{th}$ frame of the noise; and outputting, by the server, a denoised time-domain speech according to the SNR of the $m^{th}$ frame of the noisy speech, wherein each frame of the denoised time-domain speech is generated from iteration operations based on the power spectrum iteration factor which traces the noisy speech in time, so as to produce the denoised time-domain speech with increased SNR and improved speech quality;

wherein the obtaining the power spectrum iteration factor of the $m^{th}$ frame of the speech according to the power spectrum of the $(m-1)^{th}$ frame of the speech and the variance of the $(m-1)^{th}$ frame of the speech comprises:

determining the variance $\sigma_s^2$ of the $(m-1)^{th}$ frame of the speech, wherein $\sigma_s^2=E\{|Y(m-1,k)|^2\}-E\{|D(m-1,k)|^2\}$; wherein Y(m−1,k) denotes the $(m-1)^{th}$ frame of the noisy speech; and $E\{|Y(m-1,k)|^2\}$ denotes an expectation of the $(m-1)^{th}$ frame of the noisy speech; D(m−1,k) denotes the $(m-1)^{th}$ frame of the noise; $E\{|D(m-1,k)|^2\}$ denotes an expectation of the $(m-1)^{th}$ frame of the noise;

determining the power spectrum iteration factor α(m,n) of the $m^{th}$ frame of the speech according to a following formula:

$$\alpha(m,n)=\begin{cases}0 & \alpha(m,n)_{opt}\le 0\\ \alpha(m,n)_{opt} & 0<\alpha(m,n)_{opt}<1\\ 1 & \alpha(m,n)_{opt}\ge 1\end{cases};$$

wherein $\alpha(m,n)_{opt}$ denotes an optimum value of α(m,n) under a minimum mean square condition and is determined by $$\alpha(m,n)_{opt}=\frac{\left(\hat{\lambda}_{X_{m-1|m-1}}-\sigma_s^2\right)^2}{\hat{\lambda}^2_{X_{m-1|m-1}}-2\sigma_s^2\hat{\lambda}_{X_{m-1|m-1}}+3\sigma_s^4},$$

wherein m denotes a frame index of the speech; n=0, 1, 2, 3 . . . , N−1; N denotes a length of the frame, $\hat{\lambda}_{X_{m-1|m-1}}$ denotes the power spectrum of the $(m-1)^{th}$ frame of the speech; when m=1, $\hat{\lambda}_{X_{0|0}}=\lambda_{min}$, $\hat{\lambda}_{X_{0|0}}$ is a preconfigured initial value of the power spectrum of the speech, and $\lambda_{min}$ denotes a minimum value of the power spectrum of the speech.

16. The server of claim 15, wherein the determining the moving average power spectrum of the $m^{th}$ frame of the speech according to the power spectrum iteration factor of the $m^{th}$ frame of the speech, the power spectrum of the $(m-1)^{th}$ frame of the speech and the minimum value of the power spectrum of the speech comprises:

determining the moving average power spectrum of the $m^{th}$ frame of the speech according to a following formula:

$$\hat{\lambda}_{X_{m|m-1}}=\max\{(1-\alpha(m,n))\hat{\lambda}_{X_{m-1|m-1}}+\alpha(m,n)A_{m-1}^2,\lambda_{min}\};$$

wherein $\hat{\lambda}_{X_{m|m-1}}$ denotes the moving average power spectrum of the $m^{th}$ frame of the speech; $\hat{\lambda}_{X_{m-1|m-1}}$ denotes the power spectrum of the $(m-1)^{th}$ frame of the speech; α(m,n) denotes the power spectrum iteration factor the $m^{th}$ frame of the speech; $A_{m-1}$ denotes an amplitude spectrum of the $(m-1)^{th}$ frame of the speech, and $\lambda_{min}$ denotes a minimum value of the power spectrum of the speech.

17. The server of claim 15, wherein the obtaining the denoised time-domain speech according to the SNR of the $m^{th}$ frame of the noisy speech comprises:

determining a correction factor of the $m^{th}$ frame of the noisy speech according to the SNR of the $m^{th}$ frame of the noisy speech, a masking threshold of the $m^{th}$ frame of the noise, an variance of the $m^{th}$ frame of the noise and an variance of the $m^{th}$ frame of the speech, the masking threshold being a maximum value of: a first masking threshold calculated based on power spectrum density of the noisy speech and an absolute hearing threshold of human ears;

determining a transfer function of the $m^{th}$ frame of the noisy speech according to the SNR of the $m^{th}$ frame of the noisy speech and the correction factor of the $m^{th}$ frame of the noisy speech, wherein the correction factor dynamically changes a form of the transfer function so as to obtain a compromised result between speech distortion and residual noise, and to improve the quality of the speech;

obtaining a $m^{th}$ frame of a denoised speech according to an amplitude spectrum of the $m^{th}$ frame of the noisy speech and the transfer function of the $m^{th}$ frame of the noisy speech; and taking a phase of the noisy speech as a phase of the denoised speech, performing an inverse Fourier transform to the amplitude spectrum of the $m^{th}$ frame of the denoised speech, to obtain a $m^{th}$ frame of the denoised time-domain speech.

18. The server of claim 17, wherein the determining the correction factor of the $m^{th}$ frame of the noisy speech according to the SNR of the $m^{th}$ frame of the noisy speech, the masking threshold of the $m^{th}$ frame of the noise, the variance of the $m^{th}$ frame of the noise and the variance of the $m^{th}$ frame of the speech comprises:

determining the correction factor of the $m^{th}$ frame of the noisy speech according to a following formula:

$$\frac{\xi_{m|m}\sqrt{\sigma_s^2+\sigma_d^2}}{\sqrt{\sigma_s^2+T'(m,k')}}-\xi_{m|m}\le\mu(m,k)\le\frac{\xi_{m|m}\sqrt{\sigma_s^2+\sigma_d^2}}{\sqrt{\sigma_s^2-T'(m,k)}}-\xi_{m|m};$$

wherein $\xi_{m|m}$ denotes the SNR of the $m^{th}$ frame of the noisy speech, $\sigma_s^2$ denotes the variance of the $m^{th}$ frame of the speech, $\sigma_d^2$ denotes the variance of the $m^{th}$ frame of the noise, T'(m,k') denotes the masking threshold of the $m^{th}$ frame of the noise, k' denotes an index of a critical band, and k denotes discrete frequency.

19. The server of claim 17, wherein the determining the transfer function of the $m^{th}$ frame of the noisy speech according to the SNR of the $m^{th}$ frame of the noisy speech and the correction factor of the $m^{th}$ frame of the noisy speech comprises:

determining the transfer function of the $m^{th}$ frame of the noisy speech according to a following formula:

$$G(\xi_{m|m}) = \frac{\hat{\xi}_{m|m}}{\mu(m, k) + \hat{\xi}_{m|m}};$$

wherein $\hat{\xi}_{m|m}$ denotes the SNR of the $m^{th}$ frame of the noisy speech.

20. The server of claim 15, further comprising:

after determining the SNR of the $m^{th}$ frame of the noisy speech according to the moving average power spectrum of the $m^{th}$ frame of the speech and the power spectrum of the $(m-1)^{th}$ frame of the noise, determining a power spectrum of the $m^{th}$ frame of the speech according to the SNR of the $m^{th}$ frame of the noisy speech and the $m^{th}$ frame of the noisy speech; and determining a power spectrum iteration factor of a $(m+1)^{th}$ frame of the speech according to the power spectrum of the $m^{th}$ frame of the speech.

* * * * *